2,760,960
Patented Aug. 28, 1956

2,760,960

ARSENIC CONTAINING SUBSTITUTED PTERIDINES

Albert L. Gazzola, Montvale, N. J., and Robert B. Angier, Pearl River, N. Y., assignors to American Cyanamid Company, New York, N. Y., a corporation of Maine No Drawing. Application September 11, 1953, Serial No. 379,736

7 Claims. (Cl. 260—242)

This invention relates to new substituted pteridines. More particularly, it relates to pteridylmethylaminophenylarsonic or arsinic acids and methods of preparation thereof.

In the past it is known that compounds having the pteroyl amino acid structure were active against macrocytic anemias and that their activity could be reversed giving an antifolic acid activity by converting the four hydroxy radical to an amino group. We have now found that if the carbonyl amino acid portion of folic acid and related compounds is replaced by an arsonic or arsinic acid radical, surprisingly the activity of the compounds is entirely changed and they show anticoagulant activity. The compounds of the present invention therefore find use in those physiological conditions where an increased clotting time is desired.

The compounds of the present invention may be illustrated by the following general formula:

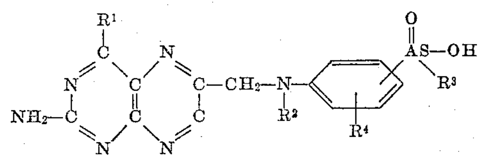

in which $R^1$ is a member of the group consisting of hydroxyl and amino radicals, $R^2$ is a member of the group consisting of hydrogen, alkyl, carboxyalkyl and carbamylalkyl radicals, $R^3$ is a member of the group consisting of hydroxyl, alkyl, carboxyalkyl radicals, $R^4$ is a member of the group consisting of hydrogen and halogen radicals.

The compounds of the present invention are, in general, crystalline solids. They are soluble in aqueous alkaline solution.

These compounds are prepared by reacting a 2,4,5-triamino-6-hydroxy or amino-pyrimidine with a 1,1,3-trihalopropanone-2 and arsanilic acid or derivatives thereof.

The 2,4,5-triamino-6-hydroxypyrimidine or 2,4,5,6-tetraaminopyrimidine are known compounds and can be prepared by methods described in the literature.

The second intermediate, namely, the 1,1,3-trihalopropanone-2 compounds are known and may be compounds such as 1,1,3-tribromopropanone-2; 1,1,3-trichloropropanone-2; 1,1,3-triiodopropanone-2. While it is usually more convenient to have all of the halogen atoms the same, the process of the present invention is intended to include those intermediates in which the halogen atoms may be different.

The third intermediate, namely, the arsanilic acid or derivative thereof may be compounds such as arsanilic acid itself; N-(4-arsonophenyl)glycine; N-(4-arsonophenyl)glycineamide; 3-bromoarsanilic acid; para-aminophenyl(carboxymethyl) arsinic acid, orthoaminophenyl arsonic acid, and the like.

The reaction to prepare the compounds of the present invention may be illustrated by the following equation:

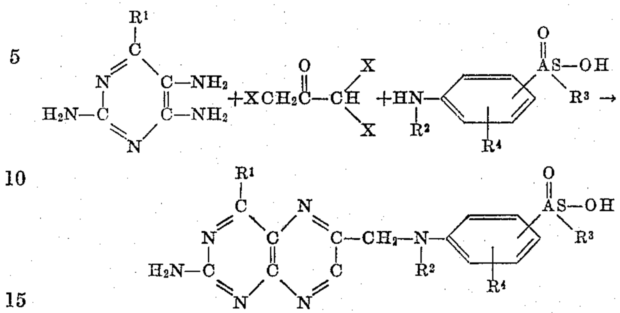

in which $R^1$, $R^2$, $R^3$ and $R^4$ are as hereinbefore defined.

In carrying out the process of the present invention it is desirable to use a temperature of from 15° to about 100° C. The preferred solvent is water, although other solvents can be used such as water and small amounts of alcohols or other solvents miscible with water. In carryout the reaction it is usually desirable to maintain the pH at from 1.5 to 4 by the addition of alkali to neutralize any acid formed in the course of the reaction.

The product is obtained from the reaction mixture by adjusting the pH to 3–5 and cooling the reaction mixture. The product thus obtained as a precipitate can be further purified by the use of the calcium salt, zinc salt, etc. as described hereinafter in the examples.

The following examples illustrate in detail methods of preparing and purifying compounds of the present invention.

EXAMPLE 1

*4-{N-[(2-amino-4-hydroxy-6-pteridyl)-methyl]-amino}phenylarsonic acid*

In 80 ml. of water at about 80° C. was dissolved 43.4 grams of arsanilic acid (0.2 mole). Then 106 grams of 2,4,5-triamino-6-hydroxypyrimidine sulfate (0.4 mole) was added, followed by 118 grams of 1,1,3-tribromopropanone-2 (0.4 mole). The mixture was kept at about 80° C. with good stirring for one-half hour, during which time 2.5 N aqueous sodium hydroxide solution was added as needed to maintain the pH at about 2.0. The total amount of alkali added was 625 ml. of the 2.5 N solution. The pH was then adjusted to about 3.5 and the mixture was kept hot and was stirred for an additional one-half hour. During this latter time the pH did not drop appreciably. The mixture was cooled to 10°–15° C., causing the crude product to precipitate. This crude product was collected, dried and found to weigh 148 grams.

One hundred forty grams of the above crude product was dissolved in 40 liters of approximately 0.1 N aqueous sodium hydroxide at 80°–85° C. and treated with 370 ml. of 30% calcium chloride and filtered hot. Thirty percent aqueous zinc chloride was added to the warm filtrate until the pH was 6.9. The zinc salt which precipitated was filtered off while warm and the damp cake was dissolved in 450 ml. of concentrated hydrochloric acid. This mixture was filtered and the filtrate was diluted with warm water to 4.5 liters. The dilute solution was cooled and the brown precipitate was collected, dried, and found to weigh 51.0 grams. Forty-eight grams of the above partially purified product was dissolved in 200 ml. of concentrated hydrochloric acid and the solution was poured into 1800 ml. of warm water containing 40 grams of activated charcoal. This mixture was filtered and the filtrate was cooled and seeded. After drying, the product in the form of dark yellow needles weighed 11.8 grams.

Exactly 1.8 grams of this material was recrystallized three times from strong aqueous hydrochloric acid, yielding 600 mgm. of yellow crystals. Some 400 mgm. of the crystalline material was completely dissolved in 400 ml. of dilute aqueous sodium bicarbonate and filtered. The filtrate was treated with sufficient warm dilute hydrochloric acid to bring the pH to about 1.5. The solution was cooled slowly. The crystalline product was collected, washed several times with water, then acetone and finally ether. The washed crystals of 4-{N-[(2-amino - 4 - hydroxy - 6 - pteridyl)methyl]amino}phenylarsonic acid were dried in the Abderhalden pistol at 64° C. over phosphorous pentoxide for one-half hour at room temperature for an additional one-half hour. The ultraviolet absorption spectrum in 0.1 N sodium hydroxide showed absorption maxima at 257.5 and 367.5 mμ. In 0.1 N hydrochloric acid there were maxima at 267.5 and 322.5 mμ.

EXAMPLE 2

*4-{N-[(2,4-diamino-6-pteridyl)-methyl]amino}-phenylarsonic acid*

Some 6.51 grams of arsanilic acid (0.03 mole) was dissolved in 120 ml. of water at 80° C. To this solution was added 11.5 grams of 2,4,5,6-tetra-aminopyrimidine sulfate (0.045 mole) followed by 13 grams of 1,1,3-tribromopropanone-2(0.045 mole). The solution was maintained at 80° C. with good stirring for about an hour, adding 2.5 N aqueous sodium hydroxide from time to time to maintain the pH at about 2.0. Twenty-five ml. of 2.5 N alkali was required. The pH was then adjusted to about 3.0 and the solution was cooled. The product which precipitated was collected, dried and found to weigh 7.0 grams. It was further purified in a manner similar to that of Example 1. The ultraviolet absorption spectrum of this material in 0.1 N sodium hydroxide showed absorption maxima at 257.5 and 372.5 mμ. In 0.1 N hydrochloric acid absorption maxima were at 267.5 and 337.5 mμ.

EXAMPLE 3

*4-{N-[(2-amino-4-hydroxy-6-pteridyl) methyl]-N[carboxymethyl]amino}phenylarsonic acid*

21.7 grams of arsanilic acid (0.1 mole) was dissolved in 225 ml. of 1 N aqueous sodium hydroxide (0.225 mole of alkali) and 11.8 grams of chloroacetic acid (0.125 mole) was added to the solution. The mixture was boiled under reflux for four hours and cooled and the cooled solution was acidified with 8.5 ml. of concentrated hydrochloric acid to a pH of about 2.0. Some 21.5 grams of crude N-(4-arsonophenyl) glycine crystallized and was separated from the cooled acid solution. The crude N-(4-arsonophenyl) glycine was suspended in water as a thin paste, to which 40 ml. of 2.5 N sodium hydroxide was added with stirring. The mixture was clarified by filtration and the filtrate was acidified with an excess of glacial acetic acid and left overnight in the chill room at aproximately 4° C. The crystalline N-(4-arsonophenyl) glycine weighed 13.5 grams and melted at 184°–185° C.

To 120 ml. of water at 80° C. was added 7.25 grams of the N-(4-arsonophenyl) glycine. To this solution was added 15.92 grams of 2,4,5-triamino-6-hydroxypyrimidine sulfate and 17.7 grams of 1,1,3-tribromopropanone-2, The molar ratio of these reactants is about 1:2:2. The mixture was stirred well while being kept at 80° C. for one-half hour, during which time 2.5 N aqueous sodium hydroxide was added at intervals to maintain the pH at about 2.0. The pH was then brought up to about 3.5 and the mixture was stirred for another one-half hour at 70°–80° C. Finally, the mixture was cooled and the product was filtered off, dried and found to weigh 13.6 grams. The product was purified by a procedure similar to that of Example 1. The ultraviolet absorption spectrum in 0.1 N sodium hydroxide showed absorption maxima at 260 and 367.5 mμ. In 0.1 N hydrochloric acid absorption maxima occurred at 267.5 and 322.5 mμ.

EXAMPLE 4

*4-{N-[(2-amino-4-hydroxy-6-pteridyl)methyl]-N-[carbamylmethyl]amino}phenylarsonic acid*

About 146 grams of N-(4-arsonophenyl) glycineamide was added to 2.4 liters of water at 80° C., and 318 grams of 2,4,5 - triamino - 6 - hydroxypyrimidine sulfate was added, followed by 354 grams of 1,1,3-tribromopropanone-2. The mixture was stirred well at 80° C. for one hour, keeping the pH at about 2.0 by occasional additions of 2.5 N sodium hydroxide. The pH was then adjusted to 3.2 and the mixture was cooled. A total of 415 grams of product was collected.

About 375 grams of crude product was slurried in 24 liters of water. Concentrated ammonium hydroxide was added, bringing the pH to about 10.0. This mixture was warmed to 70°–75° C. for one-half hour. While cooling the solution, carbon dioxide was added until the pH was exactly 8.0. The mixture was filtered at about 20° C. with the aid of diatomaceous earth. The filtrate was heated to 75° C. and concentrated hydrochloric acid was added until the pH was about 0.9. The hot solution was clarified with 10 grams of activated carbon and 10 N sodium hydroxide was added slowly to the hot filtrate to the first sign of a precipitate (about pH 2.5). The mixture was then cooled and 95 grams of partially purified product was collected. The entire 95 grams was dissolved in about 4 liters of warm 1 N hydrochloric acid and the solution was clarified with 60 grams of activated charcoal. The filtrate was cooled and 24 grams of light yellow crystalline product was collected. A portion of this material was dissolved in dilute ammonium hydroxide and filtered. The filtrate was acidified and the product thus obtained was dissolved in a few drops of concentrated hydrochloric acid. Approximately 120 volumes of hot water was added, the solution was cooled and the final product was collected, washed and dried. On analysis for carbon, hydrogen, nitrogen and arsenic the values obtained were in close agreement with the theoretical values. The ultraviolet absorption spectrum in 0.1 N sodium hydroxide showed absorption maxima at 257.5 and 367.5 mμ, and in 0.1 N hydrochloric acid at 267.5 mμ and 322.5 mμ.

EXAMPLE 5

*4 - {N[(2-amino-4-hydroxy-6-pteridyl)methyl] - amino}-3'-bromophenylarsonic acid hydrochloride*

109 grams of arsanilic acid was dissolved in 1.5 liters of boiling glacial acetic acid. When this solution was cooled, the arsanilic acid precipitated in very fine particles. Forty grams of bromine in 200 ml. of glacial acetic acid was added dropwise over a period of one hour to the cold, well-stirred suspension. The crude product was filtered off and slurried in 400 ml. of water and sufficient 10% aqueous sodium carbonate was carefully added with mild agitation to bring the pH to about 7.0. Concentrated hydrochloric acid was then added to neutralize the carbonate and leave the mixture at about 2.5 N with respect to hydrochloric acid. This mixture was heated to effect solution. Thirty-five grams of 3-bromoarsanilic acid, melting at about 255° C., crystallized from the cooled solution.

About 115 grams of 3-bromoarsanilic acid was dissolved in 1.5 liters of hot water. To this solution was added 200 grams of 2,4,5-triamino-6-hydroxypyrimidine sulfate and 225 grams of 1,1,3-tribromopropanone-2. The molar ratios are about 1:2:2, respectively. This mixture was stirred well for one-half hour at 80° C., during which time 2.5 N sodium hydroxide was added whenever necessary to keep the pH at about 2.0. The pH was then raised to about 3.0 and the mixture was stirred for an additional one-half hour at 80° C. Again, the pH was maintained by additions of 2.5 N sodium hydroxide. The mixture was cooled and 306 grams of dry product was collected. The product was purified by slight modification of the procedure described in Example 1.

EXAMPLE 6

*4-{N-[(2-amino-4-hydroxy-6-pteridyl)methyl]-amino}-phenyl-(carboxymethyl)arsinic acid*

One hundred fifty grams of p-aminophenyl(carboxymethyl)-arsinic acid and 230 g. of 2,4,5-triamino-6-hydroxypyrimidine sulfate were suspended in 2.5 liters of water and 250 grams of 1,1,3-tribromopropanone-2 was added. The mixture was stirred vigorously and heated to 80° C. keeping the pH at 2.0 with occasional additions of 2.5 N sodium hydroxide. After stirring at 80° C. for about 40 minutes, the pH was brought to 3.0 and the mixture was cooled to 15° C. The product was collected, washed with water and dried in the air. The yield was 414 grams. The product was purified in a manner similar to Example 5. The ultraviolet absorption spectrum has been determined. In 0.1 N sodium hydroxide the absorption maxima were at 261 mμ and 365 mμ. In 0.1 N hydrochloric acid the absorption maximum was at 267.5 mμ.

EXAMPLE 7

*2-{N-[(2-amino-4-hydroxy-6-pteridyl)methyl]amino}-phenylarsonic acid*

About 104 grams of o-aminophenylarsonic acid and 230 grams of 2,4,5-triamino-6-hydroxypyrimidine sulfate were suspended in 2.5 liters of water and 250 grams of 1,1,3-tribromopropanone-2 was added. The mixture was stirred vigorously and heated to 80° C., keeping the pH at 2.0 with additions of 2.5 N sodium hydroxide. After stirring at 80° C. for 40 minutes, the mixture was adjusted to pH 3.0 and cooled to 15° C. The product was collected and found to weigh 217 grams.

The above "crude" was suspended in one liter of water and dissolved by adding 10 N sodium hydroxide. This solution was treated with activated charcoal and filtered and 1200 ml. of 10 N sodium hydroxide was added to the filtrate. After cooling two days, the product was collected, redissolved in water (total volume 1100 ml.) at 50°, treated with activated charcoal and filtered. About 1100 ml. of 10 N sodium hydroxide was added to the filtrate, which was then cooled overnight. The crystalline product was collected and recrystallized two more times in the same way, using 850 ml. of water, activated charcoal and 850 ml. of 10 N sodium hydroxide each time. The crystalline sodium salt was then filtered off and added in portions to 100 ml. of cold concentrated hydrochloric acid. The sodium salt changed to the free acid and precipitated. This mixture was diluted to one liter with water and cooled. The product was collected, washed successively with water, acetone and ether and dried. The yield was 26.5 grams. The ultraviolet absorption spectrum was determined. In 0.1 N sodium hydroxide the absorption maxima were at 255 mμ and 366 mμ. In 0.1 N hydrochloric acid the maxima were at 250 mμ and 322.5 mμ.

We claim:

1. Compounds of the group consisting of those having the formula

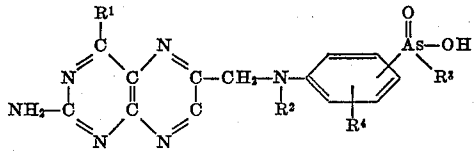

in which $R^1$ is a member of the group consisting of hydroxyl and amino radicals, $R^2$ is a member of the group consisting of hydrogen, carboxyloweralkyl and carbamylloweralkyl radicals, $R^3$ is a member of the group consisting of hydroxyl and carboxyloweralkyl radicals, $R^4$ is a member of the group consisting of hydrogen and bromine radicals and non-toxic, therapeutically-useful salts thereof.

2. 2-amino-4-hydroxypteridyl-6-methylaminophenyl arsonic acids.

3. 4-{N-[(2-amino-4-hydroxy-6-pteridyl)-methyl]amino}phenylarsonic acid.

4. 4-{N-[(2,4-diamino-6-pteridyl)methyl]-amino}phenylarsonic acid.

5. 4-{N-[(2-amino-4-hydroxy-6-pteridyl)-methyl]-N-[carbamylmethyl]amino}phenylarsonic acid.

6. 4-{N-[(2-amino-4-hydroxy-6-pteridyl)-methyl]amino}3[1]-bromophenylarsonic acid hydrochloride.

7. 4-{N-[(2-amino-4-hydroxy-6-pteridyl)-methyl]amino}phenyl(carboxymethyl)arsinic acid.

No references cited.